Aug. 12, 1958
M. TEN BOSCH ET AL
2,846,889
GYROSCOPE CONTROL SYSTEM
Filed April 7, 1952
4 Sheets-Sheet 1
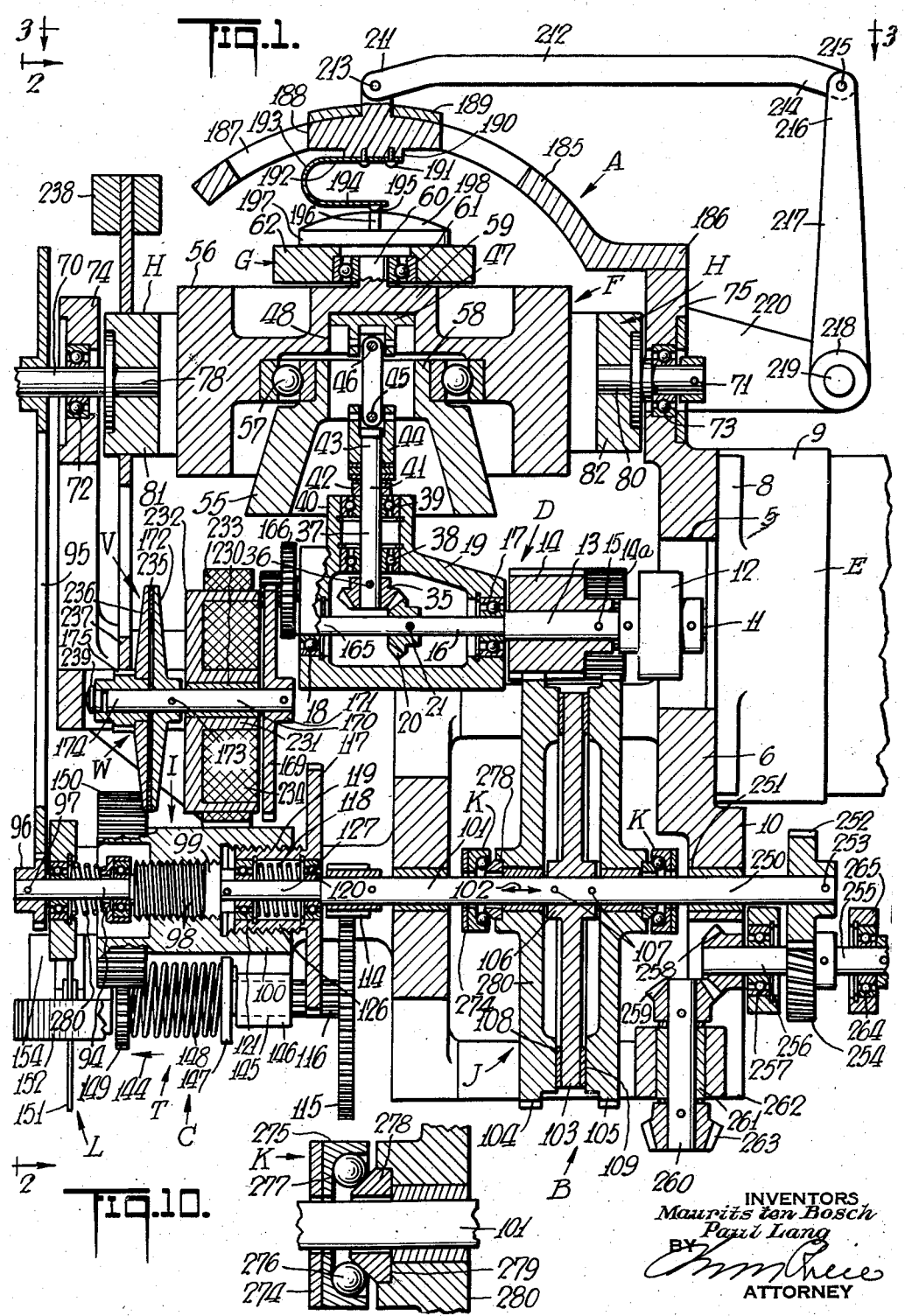
INVENTORS
Maurits ten Bosch
Paul Lang
BY
ATTORNEY

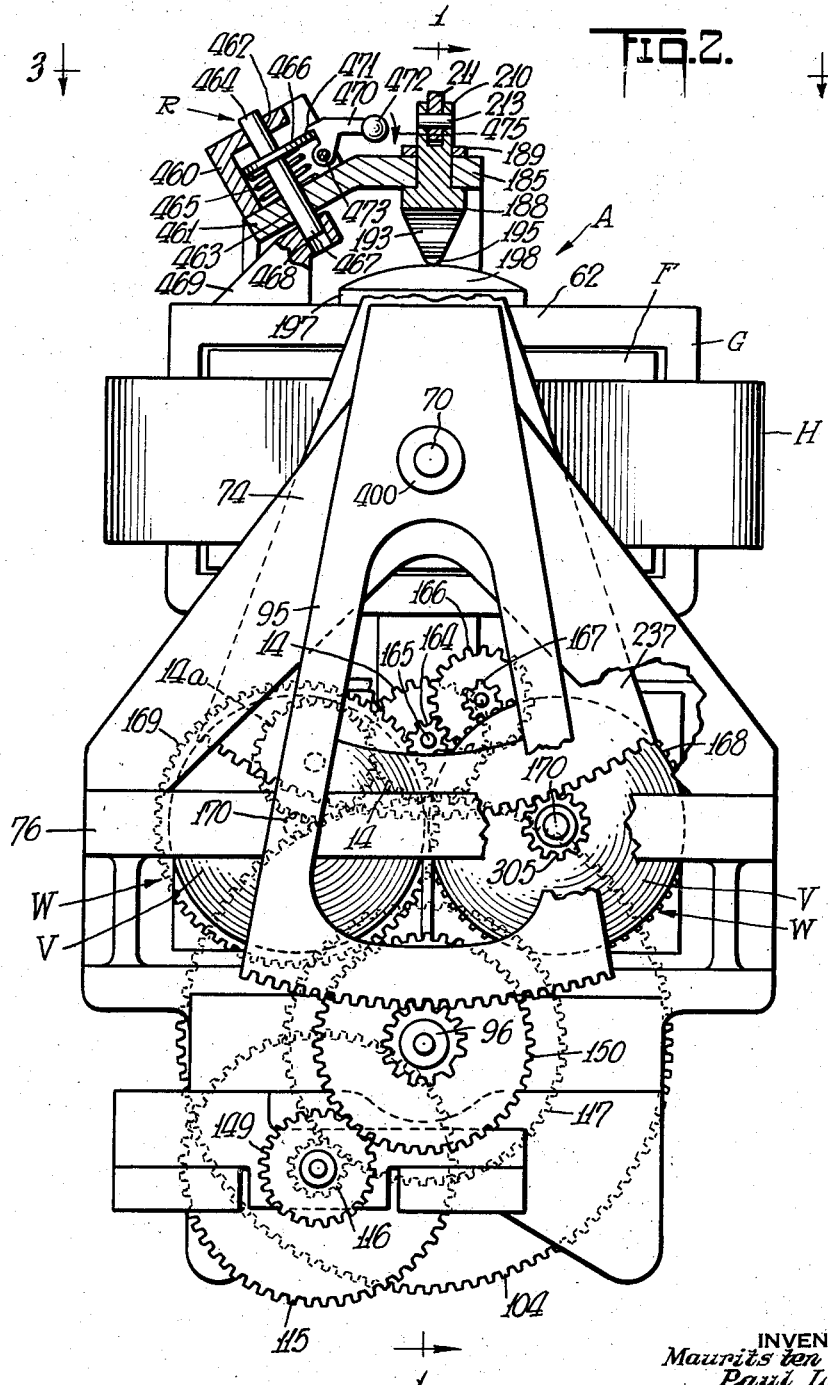

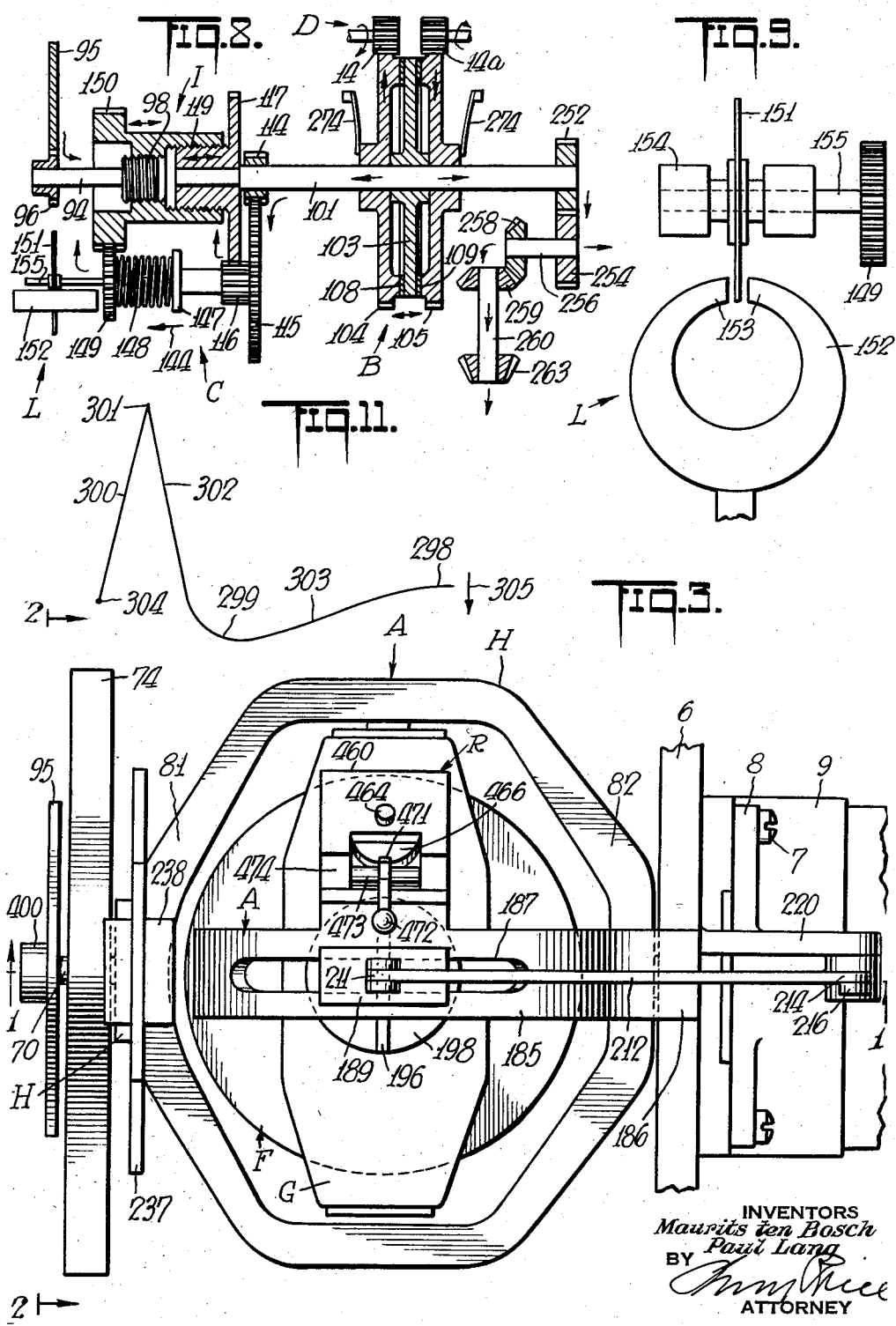

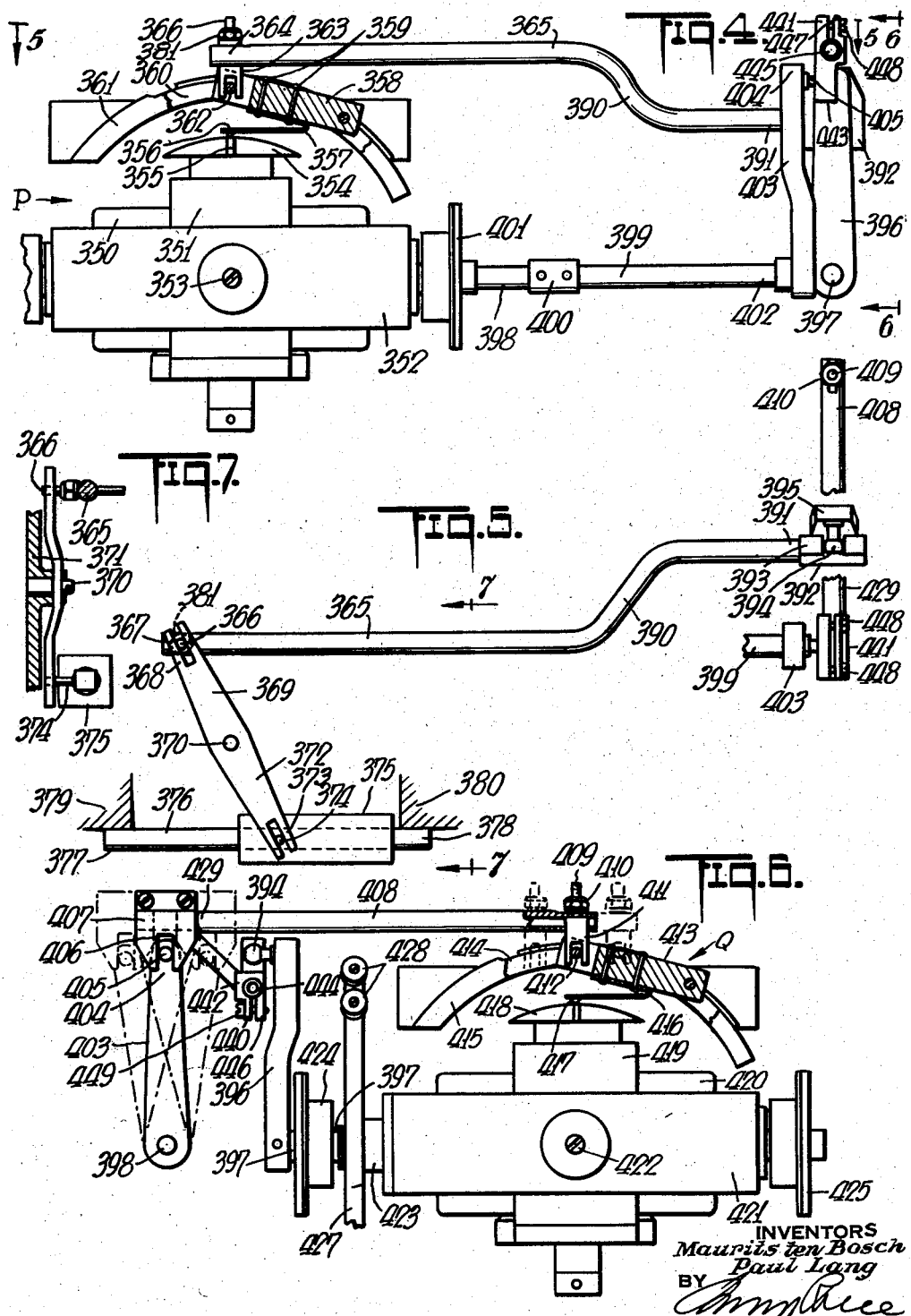

United States Patent Office 2,846,889
Patented Aug. 12, 1958

2,846,889

GYROSCOPE CONTROL SYSTEM

Maurits Ten Bosch, White Plains, and Paul Lang, Katonah, N. Y., assignors to M. Ten Bosch, Inc., Pleasantville, N. Y., a corporation of New York Application April 7, 1952, Serial No. 280,952

34 Claims. (Cl. 74—5.34)

The present invention relates to a gyroscope control system.

It is among the objects of the present invention to provide a gyroscope control system which will be capable of providing the control functions and flexibility of adjustment necessary to accurately, quickly and reliably control passage of a body through space, and which will nevertheless be quite simple in construction and operation without the necessity of utilizing complicated, expensive and difficulty adjustable and repairable rate gyroscopes and hydraulic servo mechanisms.

Another object of the present invention is to provide a simplified and reliable control system which will accurately control a body in flight and which by use of relatively simple mechanical lead elements and torque amplifiers will give a highly reliable control system with substantial reduction in expense.

Another object of the present invention is to provide a simple, reliable control system which will greatly increase the stability of a body in flight and maintain its original predetermined direction of movement giving simultaneous control at all times of pitch and yaw.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to provide a multiple and desirably a double gyroscopic control system in which the control axes may be 90° apart and in which such control axes are provided with inter-connected gyroscopic controls which would promptly and effectively control and overcome any tendency towards deviation of the predetermined axis of translation regardless of the tendency of the body which is in motion to either pitch, yaw, or otherwise depart from its predetermined direction of motion or flight.

In one preferred embodiment of the present invention the two axis systems mounted 90° apart to provide directional control in both yaw and pitch are each provided with a directional gyroscope, a torque amplifier, a lead element, a gear drive and an electric motor.

The rotor of each gyroscope is desirably mounted in an inner gimbal which in turn is pivotally mounted in an outer gimbal.

This outer gimbal is pivotally mounted in a frame and forms a gyroscopic assembly.

The gyroscopic assembly is mounted so that the pivot axis of the outer gimbal is perpendicular to the longitudinal axis extending in the direction of movement of the body on flight.

Usually when the body is inactive it will be locked against movement with the axis of spin of the gyroscopes perpendicular to both pivot axes and with the rotor axis parallel to the longitudinal axis of the direction of movement.

In the preferred structure the locking or caging mechanism may be mechanically or automatically released upon initiation of movement of the body whose flight is being controlled as, for example, by an inertia release mechanism.

Each rotor of each gyroscope is driven by an electric motor through a bevel gear and universal joint connection which latter will provide angular freedom of movement of the gyroscope with respect to the frame.

In operation, when the gyroscope is unlocked and is permitted to operate, the rotor axis will be maintained in alignment with its original direction by a cross linkage between the double gyroscopes as well as by a torquer arrangement.

When either one or both of the gyroscopes, due to external torque about the external gimbal axis, precess from their initial positions, the torquers which are associated with each gyroscope system, are energized and exert counter-movement bringing back the gyrocope to its original alignment, in which position the output of the torquer is zero. The torquers associated with the gyroscope systems also derive their power directly from the motor which drives the rotors of the gyroscope systems.

In connection with the operation of the torque amplifier, the movement of the outer gimbal of each gyroscope system relative to the frame, which is determined by the deviation from the direction of flight, will be transmitted through a gear system to such torque amplifier.

When the pinion is turned with respect to the nut as a result of the transmission to the torque amplifier the latter will exert a force in the direction of the axis of the torque amplifier pressing one of the disks against one of a pair of oppositely driven clutch gears.

These clutch gears are also driven by the motor which drives the rotor and the torquer, and depending upon the movement of the disk there will result a rotation which will be either clockwise or counter-clockwise of the output or clutch shaft.

This movement of the output shaft sets into motion the restoring mechanism, first by decelerating the movement of the body in yaw or pitch from original alignment and at the same time restores the clutch to inoperative or neutral position.

At the same time there will be set in motion a viscous damping unit, which firstly by the holding or viscous damping effect enables the torque amplifier to introduce a large displacement into the output or restoring mechanism.

The large displacement is then reduced by the operation of viscous damping unit, which may cause a counter-restoring action and a reverse clutching action.

As a result, the transmission from the outer gimbal to the torque amplifier will result in the building up of a high lead angle at the output of the torque amplifier to satisfy the desired immediate control function which will quickly be followed by dropping off to a lower level of control.

Desirably, the control applied to the body in flight through the torque amplifier has a feed-back feature which makes it possible to increase the output torque of the torque amplifier a great amount considering the relatively weak input.

The clutch disk, which is positioned between the oppositely turning gears, is desirably so adjusted that the space between the clutch disk and the oppositely rotating driving gears is so small that clutch disk rotation will follow an input signal with negligible lag and with almost substantially instantaneously control operation.

The gyroscope outer gimbal is restored by a torquer arrangement which is actuated by a commutator arrangement set in action when there is a displacement from the predetermined direction of the body in flight.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:

Fig. 1 is a side sectional view of a gyroscope installation according to the present invention, showing the control at the lower part thereof, said view being taken upon the line 1—1 of Figs. 2 and 3.

Fig. 2 is an end elevational view taken upon the line 2—2 of Figs. 1 and 3.

Fig. 3 is a top plan view taken from the lines 3—3 of Figs. 1 and 2.

Fig. 4 is a diagrammatic side elevational view of a part of a cross coupling arrangement between two associated gyroscopes.

Fig. 5 is a top elevational view taken from the line 5—5 of Fig. 4.

Fig. 6 is a side elevational view taken from the line 6—6 of Fig. 4.

Fig. 7 is a transverse sectional view taken upon the line 7—7 of Fig. 5.

Fig. 8 is a diagrammatic layout of a control system including a torque amplifier, gear drive and clutch system.

Fig. 9 is a diagrammatic top view showing the magnetic damper arrangement.

Fig. 10 is a diagrammatic side sectional view showing the thrust bearings associated with the clutch system of the torque amplifier.

Fig. 11 is a diagrammatic curve arrangement illustrating the control function of the amplifier.

Referring to Figs. 1, 2 and 3, there is shown a directional gyroscope unit A, a torque amplifier B, a lead element C, a gear drive D and an electric motor E.

The electric motor E is mounted on the side of the housing of the gyroscope unit A.

The torque amplifier B also includes the viscous unit T, which in turn includes the magnetic damper L.

Forming part of the torque amplifier B is the clutch unit J and the thrust bearing units K, which are positioned on each side of the clutch unit J.

Torquer units W include the clutch units V and serve to move the outer gimbal H to its original position.

In the cross linkage arrangement which is shown upon Figs. 4 to 7 there are two gyroscope units P and Q, the control axes of which are positioned at 90° to one another. Each of these gyroscope units may be of the same detail construction as the gyroscope units shown in Figs. 1, 2 and 3, and they may have the same torque amplifier units as shown at the bottom of Fig. 1 and diagrammatically in Fig. 8.

An important feature of the present invention resides in the differential nut unit I, forming part of the torque amplifier B.

The housing 9 of the motor (see Fig. 1) has a flange 8 which is mounted by the screws 7 upon the flat face plate portion 6 of the gyroscope housing 10.

The base plate 8 of the motor housing 9 will cover the opening 5.

The motor E has a drive shaft 11 which is provided with a coupling 12 to a shaft 13.

The shaft 13 is keyed to the gear 14 by pin 15. The reduced extension 16 of the shaft 13 is carried by the ball bearings 17 and 18 in the central housing structure 19.

The shaft 16 carries the bevel gear 20 by the key 21 intermediate its length between the ball bearings 17 and 18. The bevel gear 20 meshes with another bevel gear 35 which is keyed at 36 to the lower end of the shaft 37. The shaft 37 has ball bearings at 38 and 39 in the upwardly projecting nipple or extension 40 from the housing 19.

The shaft 37 is keyed at 41 to the collar 42 and projects at its upper end 43 into the cylindrical housing or sleeve 44. The sleeve 44 is associated with two universal joints 45 and 46 which provide angular freedom of movement between the shaft 41 and the clevis mounting 47. The clevis mounting 47 is fixed within the recess 48 of the rotor F.

The member 55 of the inner gimbal G extends downwardly in the form of a conical skirt from the narrow sleeve 58 which is associated with the ball bearing 57.

The rotor F consists of the relatively heavy member 56 which is associated with the ball bearing 57.

The outer rotor element 56 also has a central platform 59 above the recess 48 with an upwardly projecting stud 60 which rotates within the ball bearing 61 in the top element 62 of the inner gimbal G. The outer gimbal H, as shown in Fig. 3, is of octagonal shape and encloses the rectangular inner gimbal G.

The outer gimbal H has the side shafts 70 and 71 which ride within the ball bearings 72 and 73 in the frame elements 74 and 75. These frame elements 74 and 75 are triangular in shape and extend downwardly to the transverse structural elements 76.

It will be noted that the shafts 70 and 71 have extensions 78 and 80 into the side portions 81 and 82 of the outer gimbal H. Attached to the shaft 70 is the gear sector 95 which meshes with the pinion 96 keyed at 97 upon the torque amplifier input shaft 94.

The torque amplifier input shaft 94 actuates the screw element 98. The screw element 98 is threaded within the tapped recess 99 of the nut 100.

When the pinion 96 is turned by the sector 95 to rotate the screw element 98 and move the nut 100, this will cause the shaft 101 to move in either direction, as indicated by the double arrow 102. The shaft 101 carries the central disk 103 between the clutch gears 104 and 105.

The disk 103 has a central hub 106 which is fixed on the shaft 101 by the pins 107. The clutch gears 104 and 105 have the cork clutch faces 108 and 109, which upon slight movement of the disk 103 in either direction 102 will cause engagement between one of the clutch gears 104 and 105 and the central disk 103.

These gears 104 and 105 are driven in opposite directions by pinions 14 and 14a, both of which are driven from the motor E through the shaft 11 (see Figs. 1 and 8).

Upon engagement between the central clutch plate 103 with either one of the rapidly but oppositely rotating gears 104 and 105, an immediate rotation of the shaft 101 will result.

The shaft 101 upon rotating will drive the gear or pinion 114 which meshes with and drives the large gear 115. The large gear 115 turns with the small gear 116 which meshes with the gear 117. The gear 117 has a threaded sleeve extension 126 which is threaded into the tapped recess 119 in the nut 100.

It will be noted that the threaded sleeve or spindle 126 is carried by the ball bearings 120 and 121 on the shaft 101. The sleeve 126 encloses the coil spring 118 on the end 127 of the shaft 101. The spring 118 is positioned between ball bearings 120 and 121 and takes up any end play.

The gear unit 115—116 will drive the shaft 145 in the bearing block 146 which extends to the disk 147.

The disk 147 is connected to the spring 148. Through the spring 148 the shaft 145 will drive the gear 149. The gear 149 meshes with and drives the gear 150 which tends to move the nut 100 in the direction 144 which is opposite to the direction in which it was initially moved by transmission from the axis 78 through the sector 95 and the pinion 96.

The shaft 145, the disk 147, the spring 148 and the gear 149 constitute the viscous torque unit T. Forming part of the viscous torque unit T is the rotatable disk 151 which turns between the poles of the magnet 152. This disk 151 being rotated by the shaft through the spring 148 will be retarded as it rotates through the lines of force between the pole pieces 153 of the magnet 152 as is best shown in Fig. 9.

The disk 151 will act as a magnetic damper and will be operated by the gear 149 and shaft 155 from the gear 115 through the spring 148. The gear 115 in turn is driven from the pinion 114 on the shaft 101. The frame element 154, as shown in Fig. 1, will support the magnet 152 and the end of the shaft extension 155 which extends beyond the gear 149.

The differential nut unit I enables a disconnection or separation between the shaft 94 and shaft 101 which is an important feature of the present invention since longitudinal movement 102 of the shaft 101 will only be accomplished by movement of the differential nut assemblage I.

The clutch J may first be engaged in one direction by movement of the nut unit 100 to the right by rotation of the shaft 94 and of the central threaded element 98. Then the clutch J may be engaged in a reverse direction by movement of the nut unit 100 upon the central threaded element 98 upon rotation of gear 150 by the gear 149 through the spring 148 from the gear 115.

This sometimes will result in a series of clutching operations first in one direction and then in the other direction to give the desired control function.

The splitting of the shaft 94—101 enables rotation of one threaded arrangement 98—99 without rotation of the other threaded arrangement 119—126, and this differential nut arrangement I enables a relatively small or slight input through the pinion 96 to be converted into a relatively large angular movement in the output shafts at the other side of the clutch B.

Normally, the threaded arrangement 98—99 will have a relatively large pitch while the threaded arrangement 119—126 will have a relatively small pitch and these pitches may be in the ratio of about 5 to 1.

The torquer arrangements are arranged in a pair as indicated at W in Figs. 1 and 2. The torquer is driven from the end 165 of the shaft 16, and the pinion 164. The pinion 164 drives the gear 166 as is best shown in Fig. 2. Turning with the gear 166 is the pinion 167 which drives the gear 168 forming part of the right hand torquer W.

The gear 168 will also drive the gear 169 forming part of the left hand torquer W.

Each of the torquers is provided with a shaft 170 which is pinned to the hubs 171 of the gears 168 and 169.

The shafts 170 also carry the clutch disks 172 which are pinned to them at 173. The shaft 170 extends at 174 into and rotates within the pinion 175. The shaft 170, as indicated at 174, will turn freely within the pinion 175 until it is actuated by a signal caused by deviation or movement of the outer gimbal.

As indicated in the upper part of Figs. 1 and 2, from the frame element 75 there extends the circular arm 185 supported by the end flange 186. The arm 185 has a slot 187 which receives the floating shoe 188. The floating shoe 188 has a guide cap 189 and it is formed of a non-electrically conducting material. The boss 190 on the underside of the shoe 188 has riveted or screwed thereto at 191 the upper leg 192 of the U-shaped contactor 193. The lower leg 194 has a contact button 195.

The contact button 195 normally will ride at rest on the insulating strip 196 which extends diametrically across the top of the button 197 between the commutator segments 198.

A single electrical lead will be connected to each of the opposite commutator segments 198 which will in turn control the torquer W. The disk 197 as well as the diametral bar 196 will be of insulating material.

The shoe 188 has the upwardly extending clevis 210 between which extends the end 211 of the top linkage arm 212. This end 211 is held in position by the pivot pin 213.

The arm 212 at its other end 214 is pivotally connected at 215 to the upper end 216 of the arm 217. The pivot point 215 is in space.

The lower end of the arm 217 is provided with a hub 218 which is mounted on the shaft 219 of the other gyroscope. The shaft 219 is carried by the bearing bracket 220 from the structure 75.

Returning to the torquers W the shaft 170 will turn within the bearing 230 inside the hub 231 of the cup shaped frame 232 of the torquer. The cup shaped frame 232 serves as a magnetic shell or magnetic housing and is carried by the outer frame 233.

The shell 232 receives the magnetic winding or coil 234 which is energized in turn when the button 195 moves off the insulating strip 196 on to either one of segments 198. When this occurs the friction clutch V will be actuated.

Energization of the winding or coil 234 will result in one of the gears 168 or 169 being moved to the left, as shown in Fig. 1, toward the magnetic shell. This will carry to the left clutch disk 172 with clutch facing 235. This facing will be pressed against the other clutch disk 236 which is fixed to the pinion 175.

When this occurs the shaft 16 through the gear drive 164, 166, 167 and 168 on the right side or through the gear drive 164, 166, 167, 168 and 169 on the left side (see Fig. 2) will result in a rotation of the pinion 175.

This rotation of the pinion 175 will drive the cardan sector 237 on the hub 81 to torque the outer gimbal H.

The counterweight 238 balances the gyroscope around the control axis of the shafts 78—80. The cardan sector 237 will turn with the outer gimbal H. In the outer end of the hub of the pinion 175 is the thrust button 239 which will take up the thrust of the disc 236 when the coil 234 acts upon the gears 168 or 169.

It is clear therefore that the torquer W will be operated by movement of the inner gimbal G resulting in the button 195 sliding on to either segment 198. Depending upon the direction either the coils 234 of the left torquer W or the right torquer W will be energized actuating the clutch V due to longitudinal movement of the shaft 170. This serves to restore the position of the inner gimbal G.

In respect to the output of the torque amplifier unit B having the clutch unit J, the output will be transmitted through the shaft 250 and the bearing 251 (see the lower right hand corner of Fig. 1) to the pinion 252 which is keyed to the shaft 250 by the pin 253. The gear 252 is a spiral gear and it meshes with another spiral gear 254 on a lower shaft 255.

The angle of the teeth in the spiral gears 252 and 254 is such that there will be a return or feed-back thrust resulting in an increased pressure of the clutch disk 103 against one of the driving clutch gears 104 and 105.

The function of the meshing spiral gears 252 and 254 are therefore to increase the relatively weak torque which is transmitted by the movement of the outer gimbal H through the sector 95 to the pinion 96 and through the nut 100.

From the lower spiral gear 254 the shaft extends at 256 through the ball bearing 257 to drive the bevel gear 258. The bevel gear 258 drives the bevel gear 259 on the shaft 260. The shaft 260 has a bearing at 261 in the lower frame element 262. The lower end of the shaft 260 carries the bevel gear 263 which is the output of the torque amplifier B. Through the output at 263 correction may be given for any deviation in either pitch or yaw of the body in flight.

There is also another output available through the shaft 255 which has a ball bearing at 264 in the bracket 265. This output shaft 255 extending to the right, at the lower right hand corner of Fig. 1, may also serve to control the yaw and pitch of a body in flight.

The clutch assembly J is provided with the thrust bearing units K at each side of the clutch gears 104 and 105.

As best shown in Fig. 10 there is provided a cup housing 275 which is pressed toward the clutch J by the end leg 274 of a U-shaped or single leaf spring. The cup housing receives the balls 276 in the cavity 277. These balls are held in place by the bevel ring 278 which is mounted in a recess 279 in the hub 280 of the clutch gear 104 or 105.

These thrust bearings K will take up the load applied to the clutch gears 104 and 105 by the flat or leaf spring 274.

The spring 280 adjacent the pinion 96 will take up the axial play in the bearings of the input shaft 94.

In the torque amplifier system B the movement of the threaded nipple 126 in the threaded recess 119 in the nut 100 will move the shaft 101 to the left without rotating the nut 100. The nut 100 is also moved in direction 144 by rotation of the gear 150 in the opposite direction in which it has been moved by the pinion 96 and the screw 98 when an input signal is being applied to the torque amplifier B.

The spring 148 of viscous unit T will be would up by the shaft 101 acting through the gears 114 and 115. The unwinding will be retarded by the damper system 151—152.

The splitting of the shaft, as indicated at 99, with the resultant stub shafts 94 and 101 being connected by the differential nut unit will give a high angular displacement with relatively small input through the pinion 96.

To summarize, the torque amplifier B will receive a relatively small angular displacement from the outer gimbal H and give much higher displacement in the same direction to the shaft 101.

This is indicated by the diagrammatic curve shown in Fig. 11 in which the sudden and quick rise 300 at the commencement of the control operation indicates the operation at the output 255 or 263 when the outer gimbal H moves the sector 95 and the pinion 96 and serves to decelerate the deviation movement of the body in flight.

From the peak 301 the curve will move downwardly as indicated at 302. As shown, it will descend until it reaches position 299 below initial position 304. Then it will ascend to position 298.

Fig. 11 merely shows one control function in which there is first a clutching in one direction and then a clutching in the reverse direction so that the curve on the down side at 302 will pass below the initial point 304 before it returns as indicated at 303 to the zero position at 304.

In the operation as indicated by Fig. 11, the input through shaft 94 and screw 98 will cause an operation of the clutch B in one direction to give a relatively high angular displacement through the output shafts 255 and 260. While this is occurring the outer nut unit 100 will be held still or dragged by the viscous unit T. This will result in winding up the spring 148 and the spring will then unwind turning the gears 149 and 150 and causing an operation of the clutch B in a reverse direction, resulting in the curve as indicated at 302.

Referring to Fig. 11, the movement 300 will be obtained as a result of the first clutching operation and it will cause deceleration of the deviation of the body in flight from its predetermined direction.

At position 301 there will be a declutching and during the movement indicated at 302 there will be a clutch operation in the opposite direction. There will again be a second declutching at position 299 and the movement at 303 results from the third clutching operation in the same direction as the first clutching operation.

At position 298 there will be a final declutching.

Upon each clutching operation the viscous unit T will be actuated so as to cause a subsequent reverse clutching operation and there will be a series of successive clutchings and unclutchings until there is a restoration of the original predetermined direction of flight.

The cross connections between the gyroscopes are best shown in Figs. 4 to 7. As indicated in Fig. 4 the gyroscope P has a rotor 350, an inner gimbal 351 and an outer gimbal 352. The tilting axis is indicated at 353. The inner gimbal will carry the commutator 354 having the central insulating band 355. Resting on the commutator 354 will be the contact 356 of the V-shaped spring 357. The V-shaped spring 357 is mounted upon the shoe 358 by the rivets or bolts 359. The shoe 358 rides backwardly and forwardly in the slot 360. The slot 360 is in the frame extension 361. The shoe has a pin 362 which is engaged by the clevis 363. The clevis 363 is carried at the end 364 of the linkage rod 365.

As shown in Fig. 5, the pin 366 also passes through the space 367 between the clevis elements 368 of the lever 369. The lever 369 is pivoted at 370 upon the frame structure 371 as shown best in Fig. 7. The other end 372 of the lever 369 has a clevis jaw 373 which receives the pin 374.

The pin 374 is mounted upon the sliding counter-weight 375 which slides backwardly and forwardly upon the rod 376.

The rod 376 is mounted at its end portions 377 and 378 upon the frame elements 379 and 380. It will be noted that the pin 366 is threaded to receive the nut 381.

The pins 366 and 374 will slide in the slots at the ends of the lever 369. The central portion of the lever 369 is pivoted at 370 upon the frame 371 and is provided with a counter-weight 375.

The linkage rod 365 has an offset as indicated at 390 and it terminates at 391 in the block or yoke 392. The block or yoke 392 has a clevis 393 in which is received the sliding circular member 394 attached to the upper end 395 of the crank 396. The crank 396 is mounted on the control axis 397 of the other gyroscope Q of Fig. 6, which is mounted at 90° away from the gyroscope P or Fig. 4.

The main control axis 398 of the gyroscope P has a shaft 399 as shown in Fig. 4, with a coupling 400 and a bearing cup 401 which connects to the outer gimbal 352. The outer end of this axis 398, as indicated at 402, is provided with a crank 403 (see Figs. 4 and 6).

The upper end 404 of the crank 403 is provided with a slider member 405 which, as shown in Fig. 6, fits in the slot 406 of the clevis member or block 407.

The clevis member or block 407 is connected to the hollow linkage rod 408 leading to the sliding shoe. The hollow linkage rod 408 is connected to the threaded pin 409 having the nut 410.

There is provided the downwardly extending clevis 411 which receives the pin 412. The pin 412 is mounted upon the shoe 413 which slides in the slot 414 in the frame structure 415.

The shoe 413 carries the V-shaped contact spring 416 which in turn carries the contact point 417 which rides upon the commutator 418.

The commutator 418 is mounted upon the inner gimbal 419 enclosing the rotor 420 of the gyroscope Q. The outer gimbal 421 has a tilt axis provided at 422 and also has a connection at 423 to the control axis 397.

The bearing cups 424 and 425 support the shaft 397. The ends of the shaft 397 are connected to the crank 396.

The control axis 397 may be provided with the cardan sector 427 carrying the counter-weights 428. The ends 391 of the linkage 365 and 429 of the linkage 408 are provided with the clamps 440 and 441 respectively.

These clamps consist of the blocks 442 and 443 which receive the ends 444 and 445 of the hollow tubular linkages 365 and 408.

The split portions or clevises 446 and 447 are provided with the clamping screws 448 and 449 to clamp the ends 444 and 445 of the hollow rods in position.

In Figs. 2 and 3 is shown a latch arrangement which may be employed if desired to hold the gyroscope system inactive unless a sudden shock cause release thereof. The latch is indicated at R and is provided with a cage 460 mounted upon the frame element member 461.

The frame element member 461 is part of the structure 185 which guides the sliding shoe 188. The cage has the openings 462 and 463 for the pin 464. The pin 464 is encircled by the spring 465 which presses upwardly upon the plate 466. The lower end of the pin 467 extends into the opening 468 in an upward extension 469 from the inner gimbal G. When the end of the pin 467 fits in the recess 468 the inner gimbal G and the gyroscope A are locked against movement.

The end of the pin 467 is held in the opening 468 in the extension 469 by the latch 470. The latch 470 has a lip 471 which fits over the edge of the plate 466. The inertia weight 472 is attached to the end of the latch.

The latch is pivotally mounted at 473 in the sides 474 of the cage 460. Upon sudden jolt the weight 472 will be thrown downwardly as indicated by the arrow 475 releasing the lip 471 from the plate 466.

Then the spring 465 will force the plate 466 upwardly withdrawing the end 467 of the pin 464 from the recess 468. This will unlatch the inner gimbal G and permit the inner and outer gimbals freely to move to control the direction of movement of the body in question.

To summarize, the operation of the motor E of Fig. 1 through the shaft 13 will drive the inner rotor F by the bevel gears 20 and 35 and the universal connections at 45 and 46.

The motor E will also drive the oppositely turning clutch gears 104 and 105 as, for example, by the gear 14 and a gear 14a meshing therewith. However, when there is no control the central clutch disc 103 will stand still without action of either of the oppositely rotating clutch gears 104 and 105.

At the same time the end 165 of the shaft 16 through the pinion 164 and the gearing 166 and 167 will drive the torquer gears 168 and 169 in opposite directions. These torquer gears will drive the shafts 170 but unless there is a control function to be exercised the torquer clutches V will not be actuated.

The frame structure 10 of the gyroscope A is mounted upon the frame of the body whose movement is being controlled.

As soon as this body starts in motion the inertia release R will be thrown in the direction of the arrow 475 releasing the pin at 467 and permitting the inner gimbal G and the outer gimbal H to move in respect to one another.

As shown, the inner gimbal G and the outer gimbal H may turn upon the control axis 80 in Fig. 1.

When the body in motion deviates from the predetermined direction of movement two control signals will be sent out.

One control signal will be sent out through the shaft 70 and the sector 95 to the pinion 96.

The other control signal will be sent out by the commutator sections 198 through the circuit established by the contact button 195 and the contact spring 193.

First the signal applied to the pinion 96 will be transmitted to the torque amplifier system shown at the bottom of Fig. 1.

In this torque amplifier system F the turning of the pinion 96 will turn the shaft 94 and rotate the screw 98 in the nut 100 causing movement in the direction 102.

Longitudinal movement 102 of the nut 100 will cause clutching of the unit B.

This will cause the shaft 101 to move in either direction 102 and cause a contact between the oppositely rotating clutch gears 104 and 105 and the central clutch disc 103. As soon as this occurs the shaft 101 will be driven and will drive the output shafts 255 and 260 through the spiral gears 252 and 254.

The spiral gears 252 and 254 will back-feed to the clutch system G by reason of the angle of their teeth and enhance the amplification of the clutch system G.

At the same time the shaft 101 will drive the viscous unit T through the gears 114 and 115, the shaft 145 and wind up the spring 148. The spring 148 will drive the gear 149 which in turn will drive the gear 150 to rotate the nut 100.

This movement is dampened by the magnetic plate 151 moving between the closely spaced legs of the magnet 152.

As shown in Fig. 11 there will be a large angular response to the weak control signal applied to the shaft 94. At the same time the electrical signal from the commutator 198—198 will be transmitted to the coils 234 of the torquers W. This will result in the gear wheel 168 and the shaft 170 being moved to the left engaging one of the clutches V.

Through the pinions 175 this will supply torque to the sectors 237 so that the vertical axes of the rotors F will maintain their orientation in space. This control will be maintained throughout operation of the gyroscope system.

In the cross linkage system of Figs. 4 to 7 the movement of the control axis shafts 397 and 393 connected to the outer gimbals 352 and 421 will transmit a movement to the shoes 358 and 413 through linkages 365 and 408. This will result in a cross linkage connection between the two gyroscopes whose axis are 90° apart and will give a double control action.

It will be noted by reference to Fig. 10 that the flat springs 274 which bend to press the clutch gears 104 and 105 against the clutch disc 103 may be replaced by coil springs.

A particularly novel departure of the torque controller of Fig. 1 is that there is a physical separation between the input shaft 94 and the main shaft 101 of the clutch system G.

Moreover, there is a reverse transmission through the viscous unit T including the spring 148 to restore the nut 100 to its initial position. The viscous spring unit 148 together with the magnetic damper 151—152 give the system of Fig. 1 the desirable control characteristics.

To summarize, the operation of the gyroscope system and the torque transmitter, the device of the present invention will maintain the predetermined direction of movement against deviation in yaw and pitch and the cross coupling eliminates the effect of roll.

Assuming that pitch involves an up and down movement away from the predetermined direction of flight, while yaw represents a lateral movement away from the direction of flight, when the body rolls through an angle of 90° or greater the gyroscope controlling against yaw will control against pitch as the angle changes and conversely the gyroscope controlling against pitch will control against yaw. Usually both gyroscopes will be effective to control against both yaw and pitch and the rolling of the body in flight will not affect this control because of the cross-coupling of the gyroscopes.

Assume the body in motion is yawing, the control axis 78—80 of Fig. 1 would be parallel to yaw axis and the housing A will tend to rotate on a transverse axis parallel to the plane of Fig. 1.

Because of friction about the axis 78—80 the gyroscope tends to follow the housing A. This precesses the gyroscope around an axis 90° away from the axis 78—80 and perpendicular to plane of Fig. 1.

This moves one of the commutator segments 198 under the contact 195 on the U-shaped contactor 193 which sends a signal to the torquer W and energizes one of torquer clutches V. This then applies torque to the cardan sector 237 to overcome friction of system. This will maintain the gyroscope in its original oriented direction and maintain the spin axis of the rotor F in the original oriented direction.

At the same time, sector 95 which is rotating with respect to housing A will drive gear 96, which is connected to turn screw 98. This will displace nut 100 and shaft 101 longitudinally as shown at 102 to energize one of the clutches J.

A control displacement results which in turn will decelerate and reverse direction of the deviation of the body in flight, restoring original direction.

The viscous unit T, due to the winding of the spring 148, will not be immediately effective.

During this period of operation the spring 148 will be wound up through the gears 114—115 and then will unwind against the magnetic damper L, driving nut 100 as to reverse direction of displacement of shaft 101 and thereby cause declutching and possibly reverse clutching of the clutch J.

Assuming in Figs. 4 to 6 that the body has moved into yaw with the gyroscope housing A rotating on an axis which is in the plane of Fig. 1 and extending transversely across Fig. 1.

The lever 403 which is tied to gyroscope cardan sector 237 will rotate and the lever 403 will move toward one or the other dot and dash position of Fig. 6. This will displace shoe 413 on commutator 418 which will operate torquer W of gyroscope Q and the inner gimbal 419 of gyroscope Q will precess so that the spin axis of gyroscope Q will be maintained in parallelism to the spin axis of gyroscope P.

When the body moves in pitch, gyroscope Q will control gyroscope P so that spin axis of gyroscope P will be maintained in parallelism to spin axis of gyroscope Q.

Thus control of both yaw and pitch will be obtained. This method of cross-coupling will overcome any effects of roll.

Since the gyroscope spin axes are always maintained by the cross-coupling system any rolling of body will not cause any precession of the gyroscope spin axes.

Having now particularly described and ascertained the nature of the invention, and in what manner the same is to be performed, what is claimed is:

1. A torque amplifier comprising an input shaft, an output shaft, a clutch unit, means to drive said clutch unit, said clutch unit serving to drive said output shaft, said output shaft being longitudinally displaceable and connected to engage said clutch to drive said shaft in one rotational direction when moved longitudinally in one direction and in the opposite rotational direction when moved longitudinally in the other direction, and a differential nut unit to move said shaft longitudinally actuated by said input shaft and a feed-back loop from said output shaft to said differential nut unit.

2. A torque amplifier comprising an input shaft, an output shaft, a clutch unit, means to drive said clutch unit, said clutch unit serving to drive said output shaft, said output shaft being longitudinally displaceable and connected to engage said clutch to drive said shaft in one rotational direction when moved longitudinally in one direction and in the opposite rotational direction when moved longitudinally in the other direction, and a differential nut unit to move said shaft longitudinally actuated by said input shaft and a viscous unit actuated by said output shaft to actuate said nut unit to move said output shaft longitudinally in a reverse direction to the last longitudinal movement of the output shaft.

3. A torque amplifier comprising an input shaft, an output shaft, a clutch unit, means to drive said clutch unit, said clutch unit serving to drive said output shaft, said output shaft being longitudinally displaceable and connected to engage said clutch to drive said shaft in one rotational direction when moved longitudinally in one direction and in the opposite rotational direction when moved longitudinally in the other direction, and a differential nut unit to move said shaft longitudinally actuated by said input shaft and a viscous unit actuated by said output shaft to actuate said nut unit to move said output shaft longitudinally in a reverse direction to the last longitudinal movement of the output shaft, said last mentioned unit including a coil spring wound up by the rotation of said output shaft and a gear connection from said spring to said differential nut to actuate said differential nut unit upon unwinding of said spring.

4. A torque amplifier comprising an input shaft, an output shaft, a clutch unit, means to drive said clutch unit, said clutch unit serving to drive said output shaft, said output shaft being longitudinally displaceable and connected to engage said clutch to drive said shaft in one rotational direction when moved longitudinally in one direction and in the opposite rotational direction when moved longitudinally in the other direction, and a differential nut unit to move said shaft longitudinally actuated by said input shaft and a viscous unit actuated by said output shaft to actuate said nut unit to move said output shaft longitudinally in a reverse direction to the last longitudinal movement of the output shaft, said last mentioned unit including a coil spring wound up by the rotation of said output shaft and a gear connection from said spring to said differential nut to actuate said differential nut unit upon unwinding of said spring, and a damper to retard unwinding of said spring.

5. A torque amplifier comprising an input shaft, an output shaft, a clutch unit, means to drive said clutch unit, said clutch unit serving to drive said output shaft, said output shaft being longitudinally displaceable and connected to engage said clutch to drive said shaft in one rotational direction when moved longitudinally in one direction and in the opposite rotational direction when moved longitudinally in the other direction, and a differential nut unit to move said shaft longitudinally actuated by said input shaft and a viscous unit actuated by said output shaft to actuate said nut unit to move said output shaft longitudinally in a reverse direction to the last longitudinal movement of the output shaft, said last mentioned unit including a coil spring wound up by the rotation of said output shaft and a gear connection from said spring to said differential nut to actuate said differential nut unit upon unwinding of said spring, and a magnetic damper to react against unwinding of said spring.

6. A torque amplifier comprising an input shaft, an output shaft, a clutch unit, means to drive said clutch unit, said clutch unit serving to drive said output shaft, said output shaft being longitudinally displaceable and connected to engage said clutch to drive said shaft in one rotational direction when moved longitudinally in one direction and in the opposite rotational direction when moved longitudinally in the other direction, and a differential unit alternately actuated by said input shaft and said output shaft to cause reverse longitudinal movements of said output shaft and means to actuate said differential unit from said output shaft.

7. A multiple gyroscope system having control axes positioned 90° apart, each gyroscope being provided with an independent mount and with a torquer and each gyroscope being provided with a commutator actuated from the control axis of another gyroscope to cause operation of the torquer of said gyroscope.

8. A twin gyroscope system, each gyroscope having an independent mounting structure and each gyroscope having a rotor, an inner gimbal, an outer gimbal, a torquer and a commutator actuated upon displacement to operate said torquer to restore the position of said outer gimbal, and means to actuate said commutator upon the displacement of the outer gimbal of the other gyroscope.

9. In a transmission unit a longitudinal displaceable shaft, a central driven clutch element turning with said shaft, oppositely driven outside clutch elements on opposite sides of said driven element rotating on but not fixed to said shaft and a differential nut element to cause opposite longitudinal displacements of said shaft and resultant engagement of an outside clutch element and the central clutch element, said nut element including an outside structure having differentially tapped central axial recesses at each end and threaded actuating members screwed into and turning in said recesses, one of said threaded members constituting an input member and the other threaded member constituting a restoration member, both the outside structure and the threaded actuated members being freely rotatable in both directions.

10. In a transmission unit a longitudinal displaceable shaft, a central driven clutch element turning with said shaft, oppositely driven outside clutch elements on opposite sides of said driven element rotating on but not fixed to said shaft and a nut element to cause opposite and successive longitudinal displacements of said shaft to engage alternately opposite outside clutch elements with said central clutch element and cause opposite rotations of said shaft, said nut element including an outside structure having differentially tapped central axial recesses at each end and threaded actuating members screwed into and turning in said recesses, one of said threaded members constituting an input member and the other threaded member constituting a restoration member, both the outside structure and the threaded actuated members being freely rotatable in both directions.

11. A torque amplifier system comprising an input shaft, an output shaft, an intermediate clutch arrangement, means to actuate said clutch by longitudinal movement of one of said shafts and means to restore said actuating means, including a feed-back loop with a viscous unit said input shaft being provided with a sector and pinion and a gyroscope gimbal controlling said sector.

12. A torque amplifier system comprising an input shaft, an output shaft, an intermediate clutch arrangement, means to actuate said clutch by longitudinal movement of one of said shafts and means to restore said actuating means, including a feed-back loop with a viscous unit said actuating means including a nut and said input shaft providing a threaded member causing longitudinal movement of said nut, said nut being connected to cause longitudinal movement of said output shaft.

13. A multiple gyroscope control system for a plurality of gyroscopes, each having an independent supporting structure, a commutator, a torquer actuated from said commutator, a rotor, an inner gimbal and an outer gimbal and having control axes at right angles to each other and also having cross linkages to actuate the commutator of one gyroscope upon control operation of the other gyroscope.

14. A multiple gyroscope control system for a plurality of gyroscopes, each having an independent supporting structure, a commutator, a torquer actuated from said commutator, a rotor, an inner gimbal and an outer gimbal and having control axes at right angles to each other and also having cross linkages to actuate the commutator of one gyroscope upon control operation of the other gyroscope, said cross linkages including crank connections to the control axes of the outer gimbal.

15. A torque amplifier system comprising an input shaft, an output shaft, an intermediate clutch arrangement, means to actuate said clutch by longitudinal movement of one of said shafts and feed-back means connected to said last-mentioned actuating means to restore said actuating means.

16. A torque amplifier system comprising an input shaft, an output shaft, an intermediate clutch arrangement, means to actuate said clutch by longitudinal movement of one of said shafts and feed-back means connected to said last-mentioned actuating means to restore said actuating means, said last mentioned means including a viscous transmission unit.

17. A torque amplifier system comprising an input shaft, an output shaft, an intermediate clutch arrangement, means to actuate said clutch by longitudinal movement of one of said shafts and feed-back means connected to said last-mentioned actuating means to restore said actuating means, said last mentioned means including a magnetic damper.

18. A torque amplifier system comprising an input shaft, an output shaft, an intermediate clutch arrangement, means to actuate said clutch by longitudinal movement of one of said shafts and means to restore said actuating means, said last mentioned means including a spring take-up member to aid said restoration.

19. In a transmission unit to cause longitudinal displacement of a driven shaft to actuate a clutch arrangement carried by said shaft, a central rotational nut having centrally axially tapped recesses at opposite ends of the nut of different pitch and diameter, threaded members screwed into said recesses, each member being provided with primary drive means, secondary drive means on said nut and a coil spring connection between said last mentioned drive means and one of said first mentioned drive means.

20. In a transmission unit to cause longitudinal displacement of a driven shaft to actuate a clutch arrangement carried by said shaft, a central rotational nut having centrally axially tapped recesses at opposite ends of the nut of different pitch and diameter, threaded members screwed into said recesses, each member being provided with a drive gear and a drive gear on said nut being actuated by one of said drive gears.

21. A feed back differential nut system for longitudinally moving a reversible driven shaft comprising inner and outer rotatable nut elements, one of said elements being split and one of the split elements being longitudinally movable and the other being fixed against longitudinal movement, external drive means to drive said fixed split element and internal drive means to drive said unsplit element from said shaft.

22. The system of claim 21, said internal drive means including a gearing train driven by said shaft, a spring connection means driven by said gearing train and a magnetic damper connected to said spring connection means, said spring connection means and said magnetic damper acting as a viscous unit.

23. In a feed back torque amplifier having a rotatable and longitudinally movable shaft and a double clutch turning said shaft in one rotational direction upon longitudinal movement of the shaft in one direction and in the other rotational direction upon longitudinal movement of the shaft in the opposite direction and a differential arrangement to effect said longitudinal movement, said arrangement having inner and outer rotatable elements, one of which is split, one of said split elements being fixed against longitudinal movement and the other split element being longitudinally movable, the outer unsplit element being longitudinally movable and independent drive means for the outer element and the fixed inner element.

24. The amplifier of claim 23, one of said drive means being driven by said shaft and a gyroscope having an outer gimbal and connection means between the outer gimbal and the other drive means to drive said other drive means from said outer gimbal.

25. The amplifier of claim 23, one of said drive means being provided with a spring drive connection from said shaft and the other drive means being provided with a gyroscope drive.

26. A torque amplifier comprising two actuating means, a shaft, said actuating means causing longitudinal movement of said shaft, bearing mounts for said shaft to permit longitudinal and rotational movement, a double clutch arrangement, one clutch to rotate said shaft in one direction and the other to rotate the shaft in an opposite direction, one clutch being operated by movement of the shaft in one direction and the other being operated by movement of the clutch in an opposite direction and means actuated by said shaft to drive one of said actuating means to cause movement of the shaft in one direction and an outside gyroscope drive for the other actuating means.

27. The amplifier of claim 26, said actuating means including a differential nut.

28. The amplifier of claim 26, said actuating means including a differential arrangement with an outside single element and an inside split element having two central elements of different diameter one of which is longitudinally movable and the other of which is longitudinally fixed.

29. A gyroscope drive for a torque amplifier which is actuated by the outer gimbal of said gyroscope comprising an unsplit differential nut having a single interiorly threaded outside element mounted for rotational and longitudinal movement, two exteriorly threaded inside elements screwed into the ends of the outer element, one fixed against longitudinal movement and other being longitudinally movable, means to drive said fixed element from said outer gimbal, a longitudinally movable shaft actuated by said movable inside element, and means to drive said outer element from the longitudinally movable shaft.

30. A multiple gyroscope control system in which each of said gyroscopes has an independently movable platform, an inner gimbal for each gyroscope mounted on said platform, an outer gimbal for each gyroscope, an electrical torquer for each gyroscope driving said outer gimbal, a brush and commutator mounted on each said inner gimbal to actuate said torquer and a bell crank cross linkage arrangement to drive the brush of one torquer from the outer gimbal of the other gyroscope.

31. A double gyroscope control system for two gyroscopes, each having independently movable inner and outer gimbals, electrical torquers to drive said outer gimbals and a brush and commutator arrangement on the inner gimbal to control said electrical torquers and cross coupling means between the gyroscopes whereby movement of the spin axis of one gyroscope will move the brush of the arrangement on the other gyroscope.

32. The unit of claim 9, connecting means being provided to drive the outside structure from the second mentioned member.

33. The transmission unit of claim 9, a drive connection between said restoration member and said outside structure to drive said outside structure from said restoration member and means to retard said drive.

34. The transmission unit of claim 9, said shaft being provided with a gear reduction unit and said gear reduction unit being connected to said second mentioned member.

References Cited in the file of this patent

UNITED STATES PATENTS

| | | |
|---|---|---|
| 404,365 | Richards | May 28, 1889 |
| 803,565 | Dina | Nov. 7, 1905 |
| 1,066,860 | Sparman | July 8, 1913 |
| 1,161,157 | Radiguer | Nov. 23, 1915 |
| 1,324,477 | Tanner | Dec. 9, 1919 |
| 2,311,010 | Vickers | Feb. 16, 1943 |
| 2,521,759 | Sorenson | Sept. 12, 1950 |
| 2,576,863 | Ten Bosch et al. | Nov. 27, 1951 |
| 2,586,941 | Gretener et al. | Feb. 26, 1952 |